J. J. CULP & W. H. MONTAGUE.
Corn, Cotton, and Seed Planter.
No. 221,532. Patented Nov. 11, 1879.
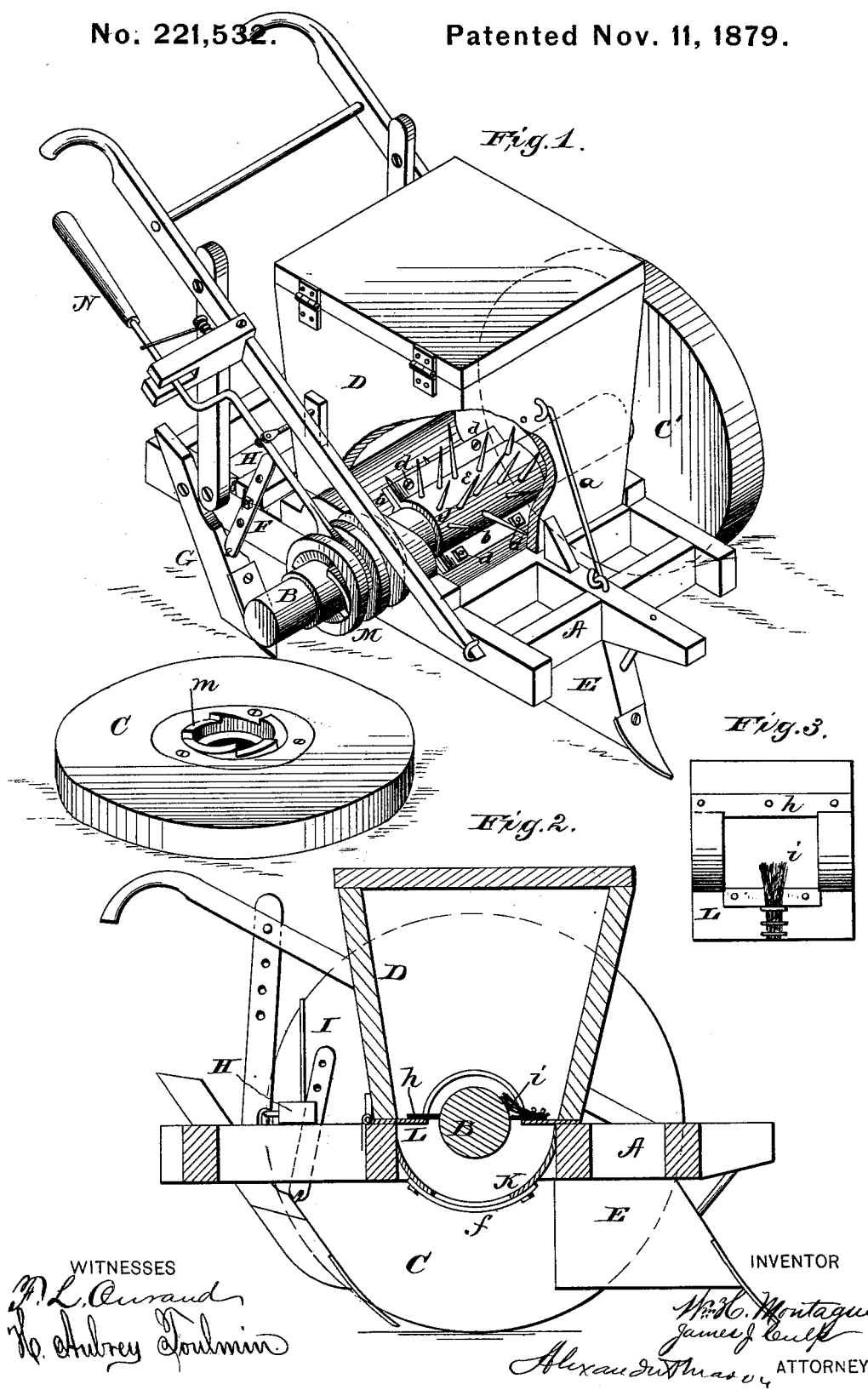

UNITED STATES PATENT OFFICE.

JAMES J. CULP AND WILLIAM H. MONTAGUE, OF BELL'S DEPOT, TENN.

IMPROVEMENT IN CORN, COTTON, AND SEED PLANTERS.

Specification forming part of Letters Patent No. 221,532, dated November 11, 1879; application filed April 15, 1879.

*To all whom it may concern:*

Be it known that we, JAMES J. CULP and WILLIAM H. MONTAGUE, of Bell's Depot, in the county of Crockett, and in the State of Tennessee, have invented certain new and useful Improvements in Corn, Cotton, and Seed Planters; and we do hereby declare that the following is a full, clear, and exact description thereof, reference being had to the accompanying drawings, and to the letters of reference marked thereon, making a part of this specification.

The nature of our invention consists in the construction and arrangement of a corn, cotton, and seed planter, as will be hereinafter more fully set forth.

In order to enable others skilled in the art to which our invention appertains to make and use the same, we will now proceed to describe its construction and operation, referring to the annexed drawings, in which—

Figure 1 is a perspective view of our invention as a seed-planter. Fig. 2 is a longitudinal vertical section of the same as a corn-planter. Fig. 3 is a detailed view of a part thereof.

A represents a rectangular frame, of any suitable dimensions, suspended or supported by suitable boxes on an axle, B, having the wheels C C' on its ends.

D is the hopper, which is hinged at its rear end and held down in place by a hook, $a$, which can be easily loosened for throwing back the hopper when desired.

In the center, at the front end of the frame A, is attached the furrow-opener E, which may be constructed in any suitable manner, according to the work to be done.

At the rear end of the frame, on each side, is pivoted a plow or coverer, G, which has a brace or link, F, flexibly connected to its front side. This brace has a series of holes for attaching the same at different points to the end of a loose bar, H, which lies on the frame in rear of the hopper.

By changing the connection of the braces or links F the plows are adjusted at different angles up and down, to regulate the depth at which they are to work.

The bar H is provided with a lever or handle, I, by means of which the bar may be turned over backward, and thus raise the plows entirely out of the ground.

The axle B forms a cylinder between the side bars of the frame, and on this cylinder is secured a spiked shell or cap, J. This cap is made in two longitudinal halves, each of which has along its edges a flange, $b$, and these flanges are connected together by bolts $d$, so as to clamp the cap tightly on the cylinder or axle.

A number of spikes, $e$, are passed through and project from the cap for agitating the seed and carrying it down. Below the hopper, to the frame is attached a concave bottom, K, which is slotted and provided with a gate or register, $f$.

By raising the hopper and removing the spiked cap J, and then attaching a plate, L, (shown in Figs. 2 and 3,) the machine is transformed into a corn or pea planter.

On the plate L, in rear of the cylinder or axle, is attached a leather strip, $h$, which prevents the grain from falling below the plate and hanging or from being cut. In front of the cylinder, to the plate, is also attached a brush, $i$, to prevent hanging or cutting grain.

The wheel C is, on its inner side, on the hub, provided with a ratchet, $m$, and between this wheel and the frame on the axle is a movable clutch, M, which is operated by means of a lever, N, for the purpose of throwing the machine in and out of gear, thereby starting and stopping the process of planting while moving.

We are aware that bisected sleeves or cylinders for seed-planters to change from one kind of planting to another have been used before, and we do, therefore, not claim such, broadly, as our invention.

Having thus fully described our invention, what we claim as new, and desire to secure by Letters Patent, is—

1. In a seeding-machine, the spiked semi-cylindrical caps J, provided at their edges with longitudinal flanges $b$, and clamped around the axle B by bolts $d$ through the flanges, substantially as and for the purposes herein set forth.

2. The plate L, made in rectangular form, having central opening, and provided with the leather strip $h$ and brush $i$, in combination with the cylinder, for the purposes herein set forth.

In testimony that we claim the foregoing we have hereunto set our hands this 24th day of March, 1879.

J. J. CULP.
W. H. MONTAGUE.

Witnesses:
M. V. BETTIS,
ED. T. BINFORD.